July 22, 1952 — E. J. STANWYCK — 2,603,902

FISH LURE

Filed Dec. 23, 1948

INVENTOR.
EDMUND J. STANWYCK
BY
Morgan, Finnegan & Durham
ATTORNEYS.

Patented July 22, 1952

2,603,902

UNITED STATES PATENT OFFICE 2,603,902

FISH LURE

Edmund J. Stanwyck, Newburgh, N. Y.

Application December 23, 1948, Serial No. 66,937

1 Claim. (Cl. 43—42.36)

The present invention relates to an improved fish lure.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvement herein shown and described.

The accompanying drawings, referred to herein and constituting a part hereof, illustrate an embodiment of the invention, and together with the description, serve to explain the principles of the invention.

The invention has for an object the provision of an improved fish lure the construction of which is such that the possibility of breakage upon a heavy strike is minimized and loss of the fish even when the outer casing of the lure is broken is prevented. A further object is the provision of a fish lure which is designed and fabricated to give the necessary illusion of a minnow, performing in the water with a minnow-like motion but stabilized so as to prevent complete turning of the lure. The invention further provides a lure adapted for both fly and bait casting, and means are provided for automatically adjusting the weight of the lure for the test performance in both uses. The lure of the present invention is strongly and realistically fabricated preferably from plastic and steel wire, and the use of plastic allows the efficient coloring of the lure in a striking and provocative design.

Figure 1:
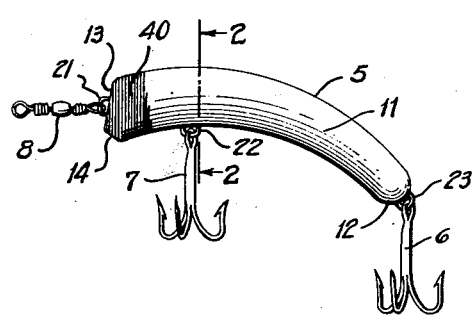
Fig. 1 is a side elevation of a typical and illustrative embodiment of the present invention.
Figure 2:
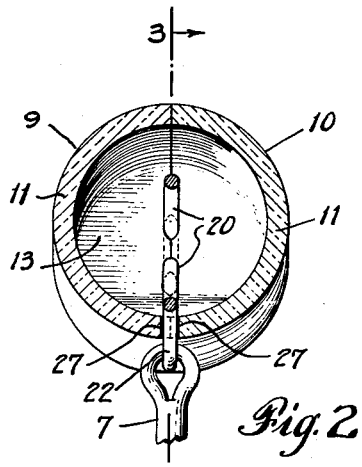
Fig. 2 is a cross-sectional view on an enlarged scale taken along line 2—2 of Fig. 1.
Figure 3:
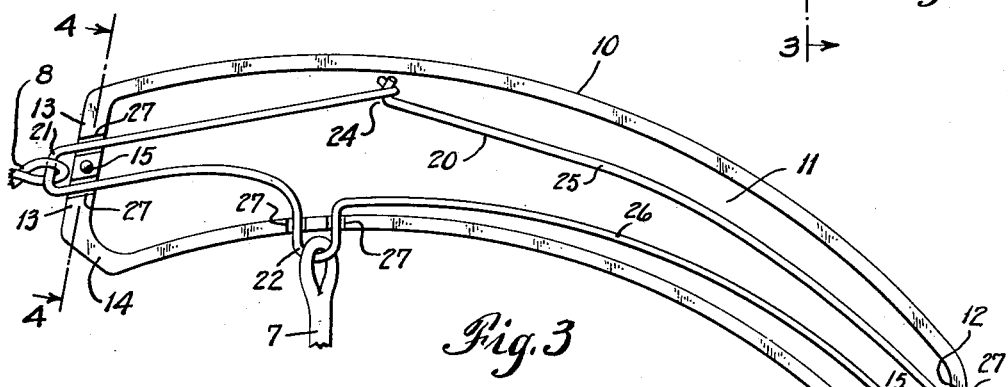
Fig. 3 is a cross-sectional view taken along line 3—3 of Fig. 2.

Referring now in detail to the illustrative embodiment of the invention shown by way of example in the accompanying drawings, the lure comprises generally the body portion 5 to which are attached the cluster hooks 6 and 7, the whole of which is to be secured to the leader by means of a swivel 8, for instance, as indicated in Fig. 1 of the drawings.

The body portion 5 of the lure is preferably made of plastic material such a tenite, for instance, and is made in two mouldings 9 and 10 adapted to be fitted together and bonded as shown in the drawings. The moulded members 9 and 10 are provided in the forms shown in the drawings, being hollow and with their major longitudinal extent provided by a wall 11 which is rounded to form the top and bottom of the member and curved along the length thereof. The rear ends of the moulded members 9 and 10 are rounded out in walls 12, and the front ends are made up of the angularly related walls 13 and 14.

The moulded members 9 and 10 are adapted to be fitted together with the upper and lower edges of walls 11, 12, 13 and 14 in abutment, thus forming the hollow, plastic lure body portion 5. Projections 15 are preferably provided on the walls 12 and 13 of the member 10 adapted to seat in depressions 16 in the corresponding walls of the member 9, as an aid in accurately fitting together the two half-body members 9 and 10.

The hooks and leader are secured to the lure and directly to each other by means of the wire connector member indicated generally by the numeral 20 in the drawings. The wire 20 is preferably made of strong stainless steel of high resiliency bent into the form shown. There is thus provided a bent portion 21 extending through the front wall of the lure body 5 to which the swivel 8 or the leader may be attached. The wire also by means of bent portions or loops 22 and 23 extends through the lower and rear walls of the lure body for attachment of the hooks 7 and 6 respectively. The free ends of the wire 20 are turned to engage one another as indicated at 24 whereby the wire in effect, becomes a continuous, closed, resilient element having a pair of reaches 25 and 26 extending longitudinally of the lure body in angular relation to each other and to which the hooks and leader are attached. The reaches 25 and 26 are preferably spaced from the surrounding walls of the lure body, and it will be apparent that when a heavy and sudden pull is exerted by a catch on a hook, the force is transmitted directly through the wire 20 whereby the plastic body is saved from breaking strains. The curved formation of the wire 20 and the spacement of its reaches from the walls of the body 5 also provides a resilient spring which protects both the body and leader from sudden and heavy pulls. The spacement of the wire from the lower wall of the body, that is, in the direction of the concave curvature of the wire, is particularly important, as pull on the hooks pulls the wire in this direction. It will further be apparent that even should the body 5 of the lure be broken, the hooks and leader are still firmly interconnected by the wire 20.

Figure 4:
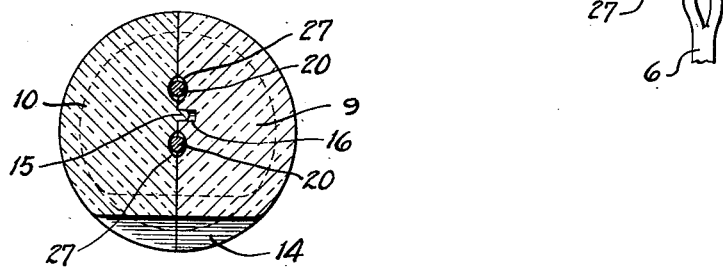
Fig. 4 is a cross-sectional view taken along line 4—4 of Fig. 3.

The bent or looped portions 21, 22 and 23 of wire 20 are received within depressions 27 in the walls of the body members 9 and 10, said depressions being correspondingly located in said members so that when they are assembled together, apertures are provided for passage of the wire through the body portion of the lure. Such depressions 27 are made of such size that in the assembled lure, the apertures formed are a little larger than needed to accommodate the wire 20, whereby a slight spacement is provided between certain parts of the wire and the lure body 5, as clearly shown in Fig. 4. Such spacement allows movement of the wire 20 with respect to the body 5, serving to free the body from forces exerted on the wire and utilizing the resilient formation of the wire to minimize the forces exerted on the lure.

When the lure is assembled the free edges of the members 9 and 10 are suitably bonded together except that care is taken that the relatively small apertures about the wire 20 leading into the hollow interior of the body are not filled. Such apertures have the further purpose of permitting the seepage of water into the interior of the body. When the assembled lure is used for fly casting the continual casting of the lure evicts the water from the interior of the lure, keeping it light and unloaded with water. In bait casting, however, the lure is pulled considerable distances through the water, and a substantial amount of water is taken into the interior of the body. This gives the lure the necessary weight for casting and the intermittent, infrequent casts of the angler do not evict the water entirely.

The curved formation of lure body gives it the appearance of a minnow, and it is so designed as to have a minnow-like motion in the water. The flat walls 13 and 14 of each member 9 and 10 cooperate in the assembled lure to provide a pair of flat surfaces at the front of the lure inclined with respect to each other. The surfaces plus the pull of the line at the head of the lure stabilize the lure to an extent preventing its turning completely over and thus possibly fouling the line, but at the same time permit the minnow-like movement of the lure in the water induced by the curvature of the body.

The lure of the invention is preferably provided with a highly colored head portion as indicated by the numeral 40 in Fig. 1 of the drawings. The lure body is preferably made, as has been said, of tenite plastic, and the colored portion 40 may be provided from oil soluble dyes. Such dyes are mixed with methyl ethyl ketone and pure denatured alcohol in equal proportions, and then applied to the portion of the lure to be colored. The surface of the body of the lure is dissolved to some extent and the dye is permanently fixed in the plastic. The proportion of dye to the combination of alcohol and methyl ethyl ketone may be varied depending upon the intensity of the color desired.

The invention in its broader aspects is not limited to the specific mechanisms shown and described but departures may be made therefrom, within the scope of the accompanying claim, without departing from the principles of the invention and without sacrificing its chief advantages.

What is claimed is:

A fish lure comprising a hollow body having a curved formation longitudinally and provided with pairs of openings at the ends and in the bottom of the body, a resilient wire connector for a leader and hooks, said wire connector extending through the openings and defining loops adjacent to and exterior of the ends and bottoms of the body, and upper and lower reaches within the body, the lower reaches of the wire conforming in curvature substantially to the longitudinal curvature of the body, and the upper reaches thereof being in spaced relation to the lower reaches and in angular relationship to each other and connected together, whereby a pull on the leader or hook connections will result in longitudinal expansion of the connector relative to the body.

EDMUND J. STANWYCK.

REFERENCES CITED

The following references are of record in the file of this patent:

UNITED STATES PATENTS

| Number | Name | Date |
|---|---|---|
| 765,482 | Hardy | July 19, 1904 |
| 1,246,162 | Ross | Nov. 13, 1917 |
| 1,323,458 | Dills | Dec. 2, 1919 |
| 1,499,689 | Pflueger et al. | July 1, 1924 |
| 1,772,058 | Welch | Aug. 5, 1930 |
| 2,008,437 | DeWitt | July 16, 1935 |
| 2,066,458 | DeWitt | Jan. 5, 1937 |
| 2,152,275 | Parkins | Mar. 28, 1939 |
| 2,224,489 | Haselwood | Dec. 10, 1940 |
| 2,445,523 | Goldbach | July 20, 1948 |
| 2,482,466 | Cooper | Sept. 20, 1949 |

FOREIGN PATENTS

| Number | Country | Date |
|---|---|---|
| 19,431 | Great Britain | Nov. 10, 1891 |
| 21,141 | Great Britain | Nov. 8, 1895 |